United States Patent
Bremmer et al.

(10) Patent No.: US 9,409,358 B2
(45) Date of Patent: Aug. 9, 2016

(54) COMPOSITE STRUCTURE CORE CRUSH PREVENTION

(71) Applicants: Jonathan Bremmer, Glastonbury, CT (US); Darryl Mark Toni, Madison, CT (US); Jeffrey G. Sauer, Woodbury, CT (US); Edward Joseph Fabian, Oxford, CT (US); Paul H. Denavit, Woodbridge, CT (US); William E. Hovan, III, Oxford, CT (US); Gregory A. Davidson, North Haven, CT (US)

(72) Inventors: Jonathan Bremmer, Glastonbury, CT (US); Darryl Mark Toni, Madison, CT (US); Jeffrey G. Sauer, Woodbury, CT (US); Edward Joseph Fabian, Oxford, CT (US); Paul H. Denavit, Woodbridge, CT (US); William E. Hovan, III, Oxford, CT (US); Gregory A. Davidson, North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 734 days.

(21) Appl. No.: 13/651,914

(22) Filed: Oct. 15, 2012

(65) Prior Publication Data

US 2014/0106116 A1 Apr. 17, 2014

(51) Int. Cl.
*B29D 24/00* (2006.01)
*E04C 2/36* (2006.01)
*B29D 99/00* (2010.01)

(52) U.S. Cl.
CPC .......... *B29D 24/005* (2013.01); *B29D 99/0021* (2013.01); *E04C 2/365* (2013.01); *Y10T 156/10* (2015.01); *Y10T 428/24157* (2015.01)

(58) Field of Classification Search
None
See application file for complete search history.

(56) References Cited

U.S. PATENT DOCUMENTS

| | | | |
|---|---|---|---|
| 3,549,468 A | | 12/1970 | Messineo et al. |
| 4,593,449 A | | 6/1986 | Meray-Hovarth et al. |
| 5,518,796 A | * | 5/1996 | Tsotsis .......................... 428/116 |
| 5,876,831 A | * | 3/1999 | Rawal .......................... 428/117 |
| 6,635,202 B1 | * | 10/2003 | Bugg et al. ................. 428/318.4 |
| 6,953,001 B2 | | 10/2005 | Fanucci et al. |
| 8,128,028 B2 | | 3/2012 | Grillos |

FOREIGN PATENT DOCUMENTS

| | | |
|---|---|---|
| WO | 9414600 A1 | 7/1994 |
| WO | 9508473 A1 | 3/1995 |

OTHER PUBLICATIONS

European Search Report for application EP 13180429.6, mailed Jan. 23, 2014, 7 pages.

* cited by examiner

*Primary Examiner* — David Sample
*Assistant Examiner* — Nicholas W Jordan
(74) *Attorney, Agent, or Firm* — Cantor Colburn LLP

(57) ABSTRACT

A composite structure includes a first laminate and a second laminate. At least one core assembly is located between the first laminate and the second laminate. The at least one core assembly includes a core component and a layer of filler material disposed at a first face of the core component. The layer of filler material at least partially fills selected cells of the core component to a fill depth such that the filler material rigidizes when cured to prevent movement and/or crushing of core component under a pressure applied during a cure cycle of the composite structure.

9 Claims, 2 Drawing Sheets

COMPOSITE STRUCTURE CORE CRUSH PREVENTION

FEDERAL RESEARCH STATEMENT

This invention was made with Government support under N00019-06-C-0081 awarded by the Department of the Navy. The Government has certain rights in this invention.

BACKGROUND OF THE INVENTION

The subject matter disclosed herein relates to the manufacture of honeycomb composite structures.

Honeycomb composite structures are typically fabricated having one or more laminate structures formed from a selected number of plies, and one or more core elements, which are often honeycomb core elements. The core elements are bonded to the laminate structures under a cure cycle involving pressure and/or high temperature applied to the composite. The pressurization during the cure cycle in many structures causes movement of at least portions of the honeycomb core elements so the resulting composite structure is not what was intended by design. Further, in some structures, the core elements may be crushed, the honeycomb core cells closing due to the movement. Such movement or closing of the honeycomb structure results in structural defects in the structure that often results in scrapping of the structure with the defects.

BRIEF DESCRIPTION OF THE INVENTION

According to one aspect of the invention, a composite structure includes a first laminate and a second laminate. At least one core assembly is located between the first laminate and the second laminate. The at least one core assembly includes a core component and a layer of filler material disposed at a first face of the core component. The layer of filler material at least partially fills selected cells of the core component to a fill depth such that the filler material rigidizes when cured to prevent movement and/or crushing of core component under a pressure applied during a cure cycle of the composite structure.

According to another aspect of the invention, a method of forming a composite structure includes positioning a first laminate in a molding tool. A core assembly is positioned in the molding tool and includes a core component and a layer of filler material applied at a first face of the core component at least partially filling selected cells of the core component to a fill depth. A second laminate is positioned over the core assembly. Pressure is applied to the composite structure, and the filler material prevents movement and/or crushing of core component under the pressure applied during a cure cycle of the composite structure.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
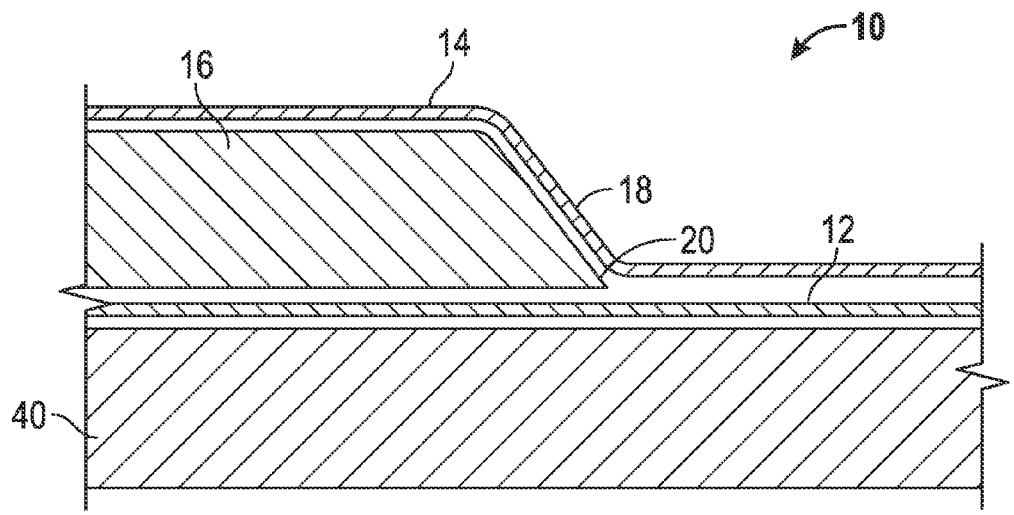
FIG. 1 is a cross-sectional view of an embodiment of a composite structure.

Shown in FIG. 1 is cross-sectional view of an embodiment of a composite structure 10. The composite structure 10 includes a first laminate 12 and a second laminate 14. The first and second laminates 12, 14 are formed of a plurality of plies of, for example, prepreg or wet layup fabric, and the fabric may be fiberglass, graphite, or any suitable material. At least one core component 16, for example, a honeycomb core, is located between the first laminate 12 and the second laminate 14, with one or both of the laminates 12, 14 having a ramp 18, or step, or other feature to allow for placement of the core component 16 between the first and second laminates 12, 14. To form the composite structure, the first laminate 14 is placed in a molding tool 40, then the core component 16 is positioned in the molding tool 40 over the first laminate 12. The second laminate 14 is applied over the core component 16 and the first laminate. One or more layers of adhesive (not shown) may be included in the composite structure 10. The composite structure 10 is cured by heating and applying pressure. Typically, when such a core component 16 is cured between two laminates 12, 14, pressure of the cure cycle, in some structures in the range of 20-30 pounds of lateral force, causes movement of at least a portion, for example, a core edge 20, of the core component 16. Further, the pressure of the cure cycle may result in lateral crushing of portions of the core component 16.

Figure 2:
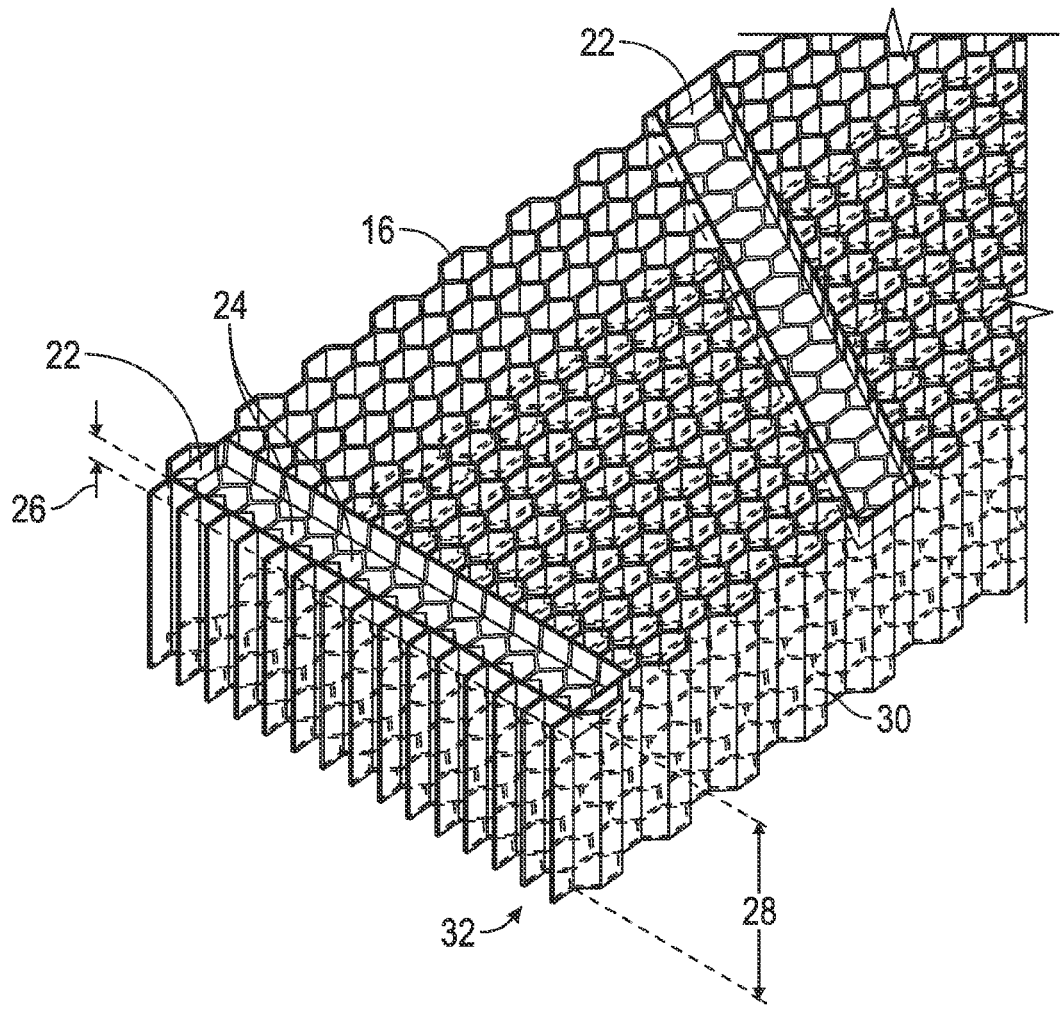
FIG. 2 is a perspective view of a core structure of and embodiment of a composite structure.

Referring to FIG. 2, to prevent such movement and damage to the core component 16, a filler material 22 is embedded into selected cells 24 of the core component 16. The filler material 22 is a material that rigidizes under cure and prevents movement and crushing of the core component 16, such as an epoxy material filled with glass filler. Other materials suitable as filler materials include urethane foams (cured or co-cure style) and foaming epoxy adhesives (co-cure). The filler material 22 is applied to the core component 16 via one or more suitable methods, such as trowel or brush or spray apparatus, and into the selected cells 24 to a selected fill depth 26, which may be a partial depth of the selected cells 24, or between about 10-50% of a cell depth 28. In some embodiments the filler material 22 is applied at a first face 30 or a second face 32 of the selected cells 24 as shown in FIG. 2, while in other embodiments the filler material 22 is applied at both the first face 30 and the second face 32. In other embodiments, the filler material 22 may be applied through the entire cell depth 28.

Once applied, the filler material 22 may be cured as a subassembly with the core component 16 before bonding with the first and second laminates 12, 14 or alternatively is co-cured with the core component 16 and laminate 12, 14 assembly.

Figure 3:
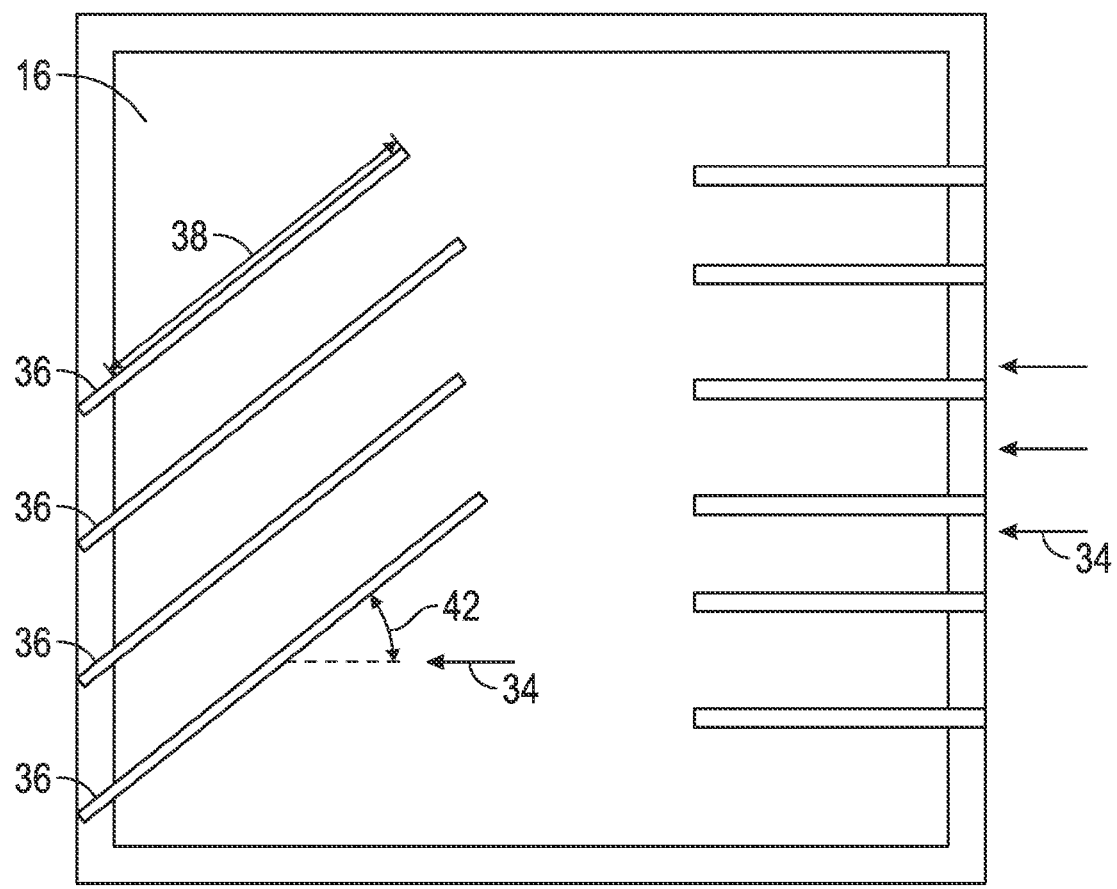
FIG. 3 is a plan view of an embodiment of a composite structure.

Referring now to FIG. 3, the filler material 22 is placed and oriented in the core component 16 to counteract a crushing force 34 applied to the core component 16 during cure of the composite structure 10. As shown, the filler material 22 may be arrayed as one or more filler strips 36 with a length 38 of each filler strip 36 oriented at a strip angle 42 to the crushing force 34, for example a strip angle 42 of about 45 degrees to counteract the crushing force 34 and prevent crushing of the core component 16. Although four filler strips 36 are shown in FIG. 3, it is to be appreciated that other numbers of filler strips 36 may be utilized as needed, for example 1, 2, 3 or more than 4 filler strips 36.

Use of the filler material 22 at selected cells 24 to counteract the crushing forces 34 allow a lighter weight core component 16 to be utilized than would be utilized in composite structures 10 without the filler material 22. Further, use of the filler material 22 allows for use of core component 16 with an increased cell depth 28 compared to those without filler material 22, thus reducing a thickness of one or both of the laminates 12,14 to achieve a composite structure 10 with a comparable thickness and core crush resistant properties.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A composite structure comprising:
   a core assembly including:
      a core component having a plurality of core cells; and
      a layer of rigidized filler material disposed at a first face of the core component at least partially filling selected cells of the core component to a fill depth, the filler material being arrayed in one or more contiguous filled strips extending across two or more cells of the core component and configured to prevent movement and/or crushing of the core component under a pressure applied in a direction substantially perpendicular to a thickness of the core component;
   a first laminate; and
   a layer of adhesive to secure the first laminate to the core assembly.

2. The composite structure of claim 1, wherein the filler material is rigidized in the selected cells via pre-curing with the core component.

3. The composite structure of claim 1, wherein the filler material is disposed at the first face and a second face opposite the first face of the core component.

4. The composite structure of claim 1, wherein the one or more filler strips are oriented at a nonparallel angle to a width of the composite structure.

5. The composite structure of claim 4, wherein the angle is about 45 degrees.

6. The composite structure of claim 1, wherein the filler material is a glass filled epoxy material.

7. The composite structure of claim 1, wherein the fill depth is between about 10% and about 50% of a core component thickness.

8. The composite structure of claim 1, wherein the fill depth equals a core component thickness.

9. A composite structure comprising:
   a core assembly including:
      a core component having a plurality of core cells; and
      a layer of rigidized filler material disposed at a first face of the core component at least partially filling selected cells of the core component to a fill depth, the filler material configured to prevent movement and/or crushing of the core component under a pressure applied in a direction substantially perpendicular to a thickness of the core component, the filler material arrayed in one or more contiguous filler strips extending across two or more cells of the plurality of core cells, the one or more filler strips oriented at a nonparallel angle to a width of the composite structure, the fill depth between about 10% and about 50% of a core component thickness;
   a first laminate; and
   a layer of adhesive to secure the first laminate to the core assembly.

* * * * *